United States Patent

[11] 3,589,207

| [72] | Inventor | Stanley Walker<br>Birmingham, England |
| --- | --- | --- |
| [21] | Appl. No. | 836,041 |
| [22] | Filed | June 24, 1969 |
| [45] | Patented | June 29, 1971 |
| [73] | Assignee | Girling Limited<br>Birmingham, England |
| [32] | Priority | July 20, 1968 |
| [33] | | Great Britain |
| [31] | | 34,709/68 |

[54] BRAKE ACTUATING SYSTEM
3 Claims, 10 Drawing Figs.

[52] U.S. Cl. ................................................ 74/478,
74/480, 188/16
[51] Int. Cl. ............................................... G05g 9/00
[50] Field of Search .................................. 188/16,
152.16; 74/478, 471, 480

[56] References Cited
UNITED STATES PATENTS

| 3,267,765 | 8/1966 | Stohler | 74/478 X |
| --- | --- | --- | --- |
| 3,343,428 | 9/1967 | Hackbarth | 74/478 |

*Primary Examiner*—Milton Kaufman
*Attorney*—Scrivener, Parker, Scrivener and Clarke ABSTRACT: In brake actuating mechanism for applying the brakes on wheels on opposite sides of a vehicle selectively or simultaneously by operation of a single pedal mounted for angular movement on a shaft, the pedal incorporates a housing in which a slipper is slidable under manual control in a direction parallel to the axis of the shaft and a U-shaped abutment member slidably mounted in a slot in the slipper couples the pedal or both sides of the vehicle in accordance with the position of the slipper.

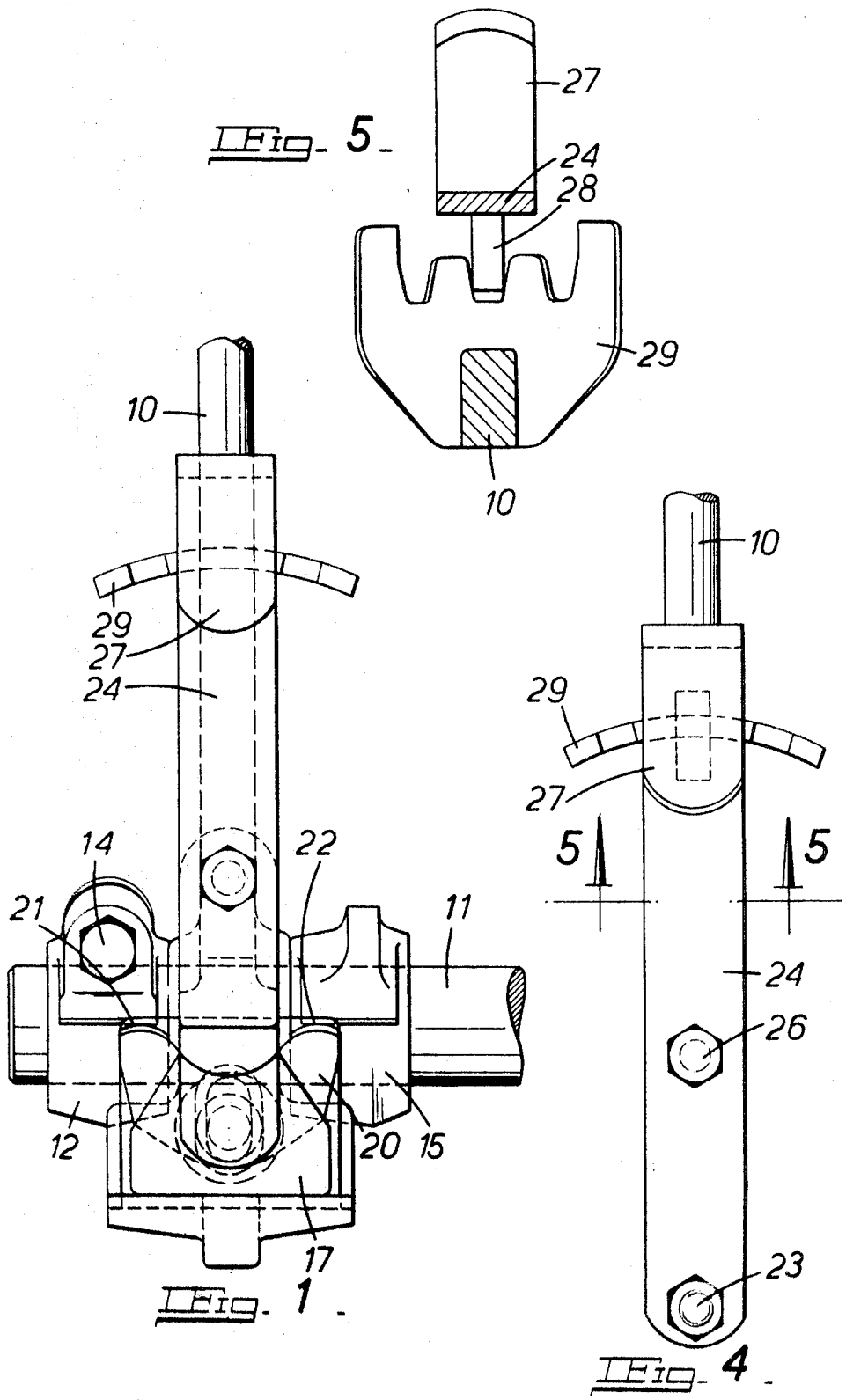

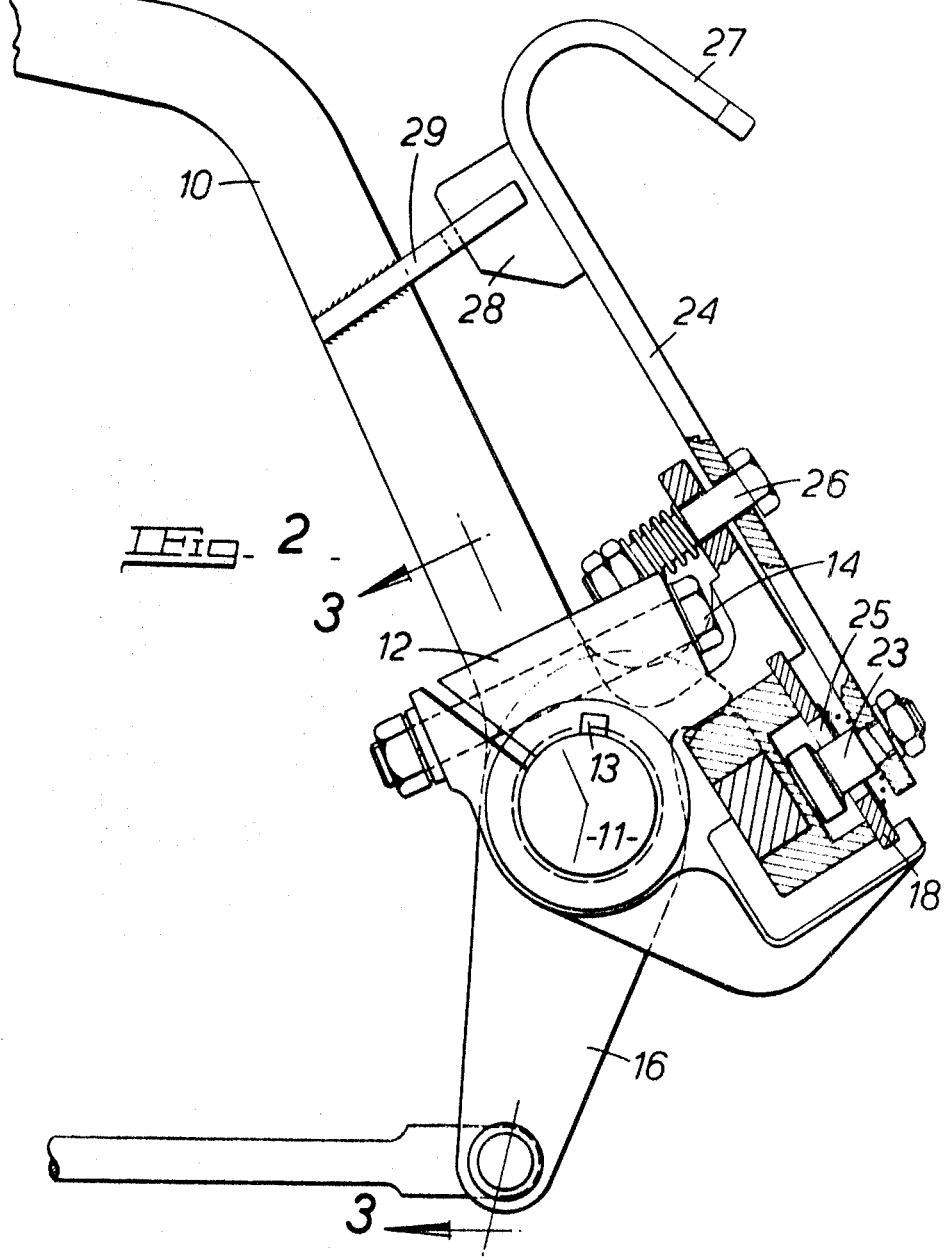

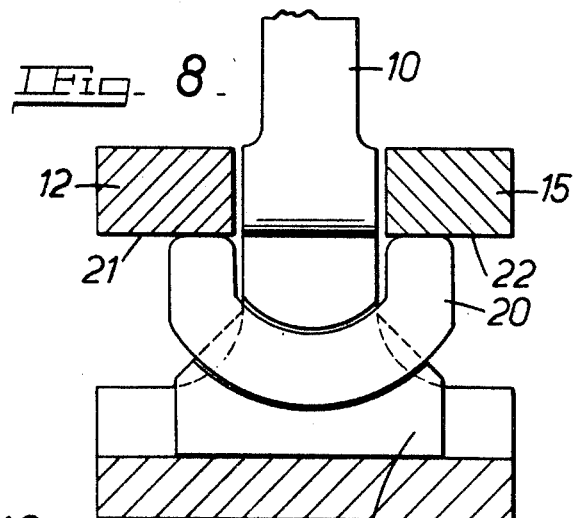
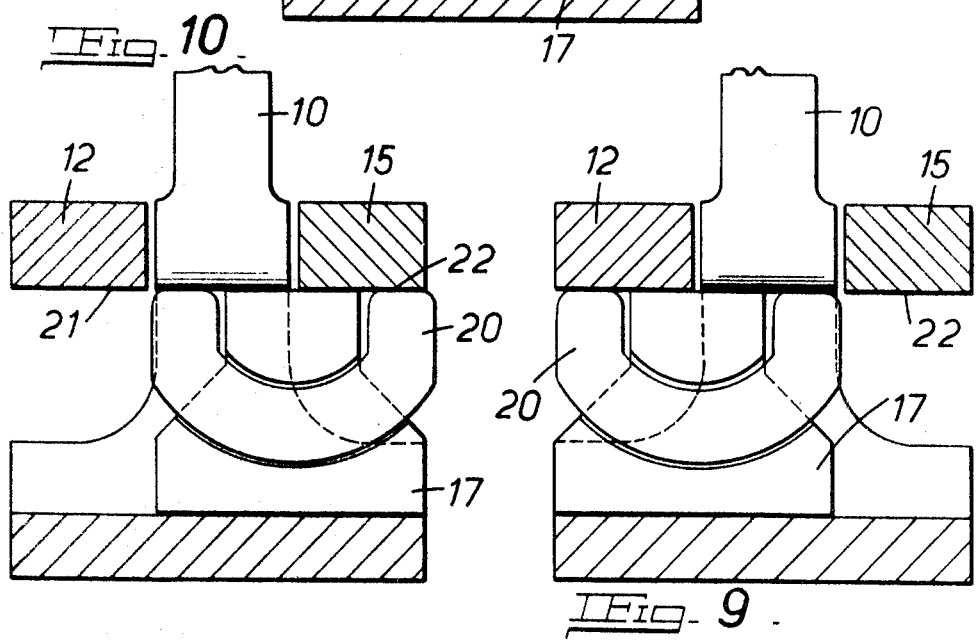
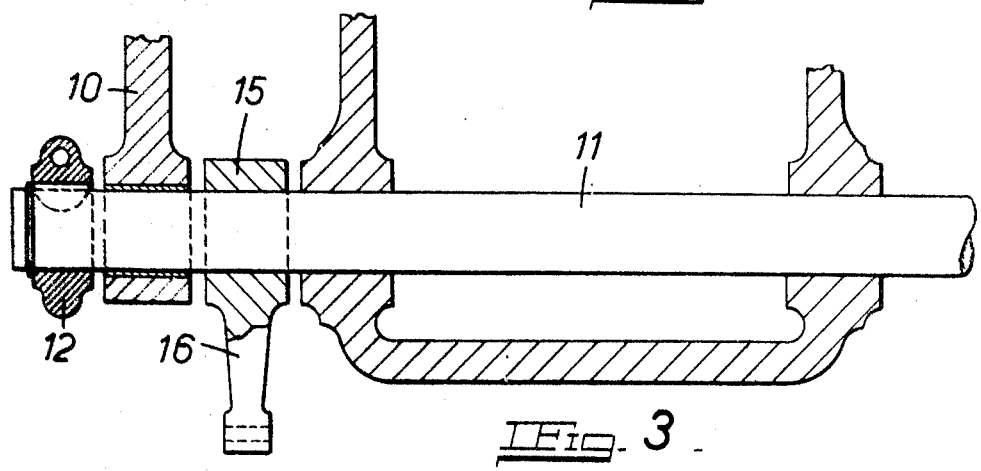

BRAKE ACTUATING SYSTEM

This invention relates to an improved actuating system for the brakes of agricultural tractors and like vehicles.

On such vehicles it is common practice to provide for actuation of brakes on wheels on opposite sides of the vehicle either simultaneously for retarding or stopping the progress of the vehicle or independently for steering the vehicle. In some cases the brakes on the wheels on opposite sides of the vehicle are applied by separate pedals which can be coupled together for simultaneous operation.

One object of our invention is to provide a single pedal actuating system which can be produced as a unit adapted to replace existing two pedal systems and in which effective compensation is provided between the brakes on the wheels on opposite sides of a vehicle when both are applied simultaneously.

In brake actuating mechanism according to our invention a single pedal is mounted for angular movement on a shaft between a lug keyed on the shaft and lug angularly movable about the shaft, and the lower end of the pedal provides a housing in which a slipper is slidable in a direction parallel to the axis of the shaft under the control of hand or foot-operated selector mechanism, and a curved or U-shaped abutment member is slidably mounted in a slot in the slipper for selective engagement with cam faces on both lugs or on either lug according to the position of the slipper.

The brakes on the wheels on one side of the vehicle are actuated by angular movement of the shaft and those on the wheels on the other side are actuated by links or other transmission members from the lug which is angularly movable about the shaft.

The slipper can be moved by the selector mechanism to extreme positions in which the abutment member engages with the pedal and one or other of the lugs on the shaft for application of the brakes on one or other side of the vehicle, or it can be set in a central position in which it engages with both lugs and the brakes on both sides of the vehicle are applied simultaneously with compensation between the brakes on the two sides to allow for unequal wear of the friction surfaces of the brakes.

The setting of the slipper is conveniently effected by a lever mounted for angular movement about a pivot on the pedal assembly and located in its different operative positions by a gate or the like.

One practical form of brake actuator mechanism in accordance with our invention is illustrated by way of example in the accompanying drawings in which:

FIG. 1 is a front view of the lower end of the assembly;

FIG. 2 is a side elevation partly in section;

FIG. 3 is a section on the line 3-3 of FIG. 2;

FIG. 4 is a front view of the selector mechanism;

FIG. 5 is a section of the selector mechanism on the line 5-5 of FIG. 4;

FIG. 6 is a perspective view of the slipper;

FIG. 7 is a perspective view of the abutment member which is housed in the slipper; and FIGS. 8, 9 and 10 are diagrammatic views showing the positions of the slipper and abutment member relative to the brake pedal and lugs corresponding respectively to the simultaneous operation of the brakes on both sides of the vehicle and to the individual operation of the brakes on the right and left sides.

In the embodiment illustrated a brake pedal 10 is mounted for angular movement about a shaft 11 rotatably mounted in a stationary bracket on the frame of a vehicle. A split lug 12 is secured on one end of the shaft by a key 13 and a clamping bolt 14. A lug (not shown) fixed on the other end of the shaft has a radially projecting arm adapted to be coupled to the brakes on the wheels on one side of the vehicle.

A lug 15 mounted for angular movement about the shaft on the other side of the pedal from the lug 12 has a radially projecting arm 16 adapted to be coupled to the brakes on the wheels on the adjacent side of the vehicle.

The lower end of the pedal is shaped to form a housing for a slipper 17 which is slidable in the housing in a direction parallel to the axis of the shaft and is retained by a cover plate 18 engaged in slots in the top and bottom walls of the housing.

The slipper is preferably made from a low friction material such as sintered copper impregnated with polytetrafluorethylene.

A curved groove 19 in the inner face of the slipper houses a generally U-shaped abutment member 20 of which the ends are adapted to engage with cam faces 21, 22 on the lugs 12 and 15.

The slipper is moved in the housing by a pin 23 mounted in the lower end of a control lever 24, the pin passing through a slot 25 in the cover plate 18. The lever pivots on a spring-loaded bolt 26 mounted in an upstanding lug on the pedal assembly.

The upper end of the lever is curved over as shown at 27 to form a handle and adjacent to the handle the lever has fixed to it a finger 28 adapted to be engaged in any one of three gate notches in a plate 29 mounted on the pedal. The spring-loading of the bolt 26 allows the lever to be drawn outwardly away from the pedal when moving it from one gate notch to another.

The control lever illustrated is designed for hand operation but it could be arranged for foot operation.

When the finger on the control lever 24 is engaged in the center gate notch in the plate 29 the slipper 17 is in a central position with respect to the lever, as shown in FIG. 8, and on operation of the lever the ends of the abutment member 20 engage the cam faces 21 and 22 on both of the lugs 12 and 15 so that the brakes on both sides of the vehicle are applied.

If the angular movements of the lugs 12 and 15 required to apply the brakes on opposite sides of the vehicle are not exactly the same owing to differential wear of the braking surfaces or differences in the yielding of or play in the transmission lines to the brakes the abutment member 20 can slide transversely in the slot in the slipper so that its ends bear on different parts of the cam faces 21 and 22 and the efforts applied to the brakes on opposite sides of the vehicle are equalized.

To apply the brakes on the right side of the vehicle only the lever 24 is moved angularly to bring the finger 28 into the right hand gate notch and this moves the slipper into the position shown in FIG. 9 in which the abutment member 20 only engages with the lug 12.

Similarly, movement of the handle to bring the finger into the left-hand gate notch moves the slipper into the position shown in FIG. 10 in which the abutment member 20 only engages with the lug 15 and only the brakes on the left side of the vehicle are applied on operation of the pedal.

The brake mechanism described above is economical to manufacture and can be factory assembled to produce a packaged unit which can be fitted to a tractor in the field in replacement of an original two-pedal system.

In the brake mechanism illustrated in the drawings the movement of the slipper 17 to select whether operation of the brake pedal will apply the brakes on both sides of the vehicle or on one side or the other is effected by the lever 24 pivotally mounted on the pedal assembly.

It will be appreciated, however, that various other means for making the selection by moving the slipper 17 may be employed. For example the movement of the slipper may be effected by a cable-actuated from a convenient point within reach of the driver.

I claim:

1. In brake actuating mechanism for the brakes of agricultural tractors and like vehicles in which brakes on wheels on opposite sides of a vehicle are applied selectively or simultaneously by operation of a single pedal, the improvement comprising a shaft adapted to be operatively connected to brakes on one side of a vehicle, a first lug keyed on the shaft, a second lug angularly movable on the shaft and adapted to be operatively connected to the brakes on the opposite side of the vehicle, a pedal mounted for angular movement on the shaft between the two lugs, a housing on the pedal, a slipper slidably mounted in said housing for movement in a direction parallel to the axis of the shaft, a selector mechanism for controlling the position of the slipper, and an abutment member slidably mounted in the slipper, said abutment member in a first position of the slipper engaging the first lug, in a second position of the slipper engaging the second lug and in a third position of the slipper engaging both lugs.

2. Brake actuating mechanism as in claim 1 wherein the slipper is formed from material having a low coefficient of friction.

3. Brake actuating mechanism as in claim 1, wherein said selector mechanism for controlling the position of the slipper comprises a lever mounted for angular movement on the pedal and locating means for locating the lever in each of its different operative positions.